Oct. 31, 1939. A. T. REID 2,177,810

PRODUCTION OF SEAMLESS ASBESTOS CEMENT PIPES

Filed March 26, 1938

A. T. Reid
Inventor

By Glascock Downing & Seebold
Attys.

Patented Oct. 31, 1939

2,177,810

UNITED STATES PATENT OFFICE 2,177,810

PRODUCTION OF SEAMLESS ASBESTOS CEMENT PIPES

Andrew Thyne Reid, Camellia, near Sydney, New South Wales, Australia, assignor to James Hardie & Coy, Pty. Limited, Sydney, Australia, a company of New South Wales, Australia Application March 26, 1938, Serial No. 198,333
In Australia June 15, 1937

3 Claims. (Cl. 91—48)

This invention relates to improvements in the manufacture of seamless pipes made from fibrous materials such as asbestos bonded with cement, and relates more particularly to means whereby uniform pressure may be applied to the pipe during manufacture, in what has been termed pipe making machine of the paper manufacturing machine type in which the length of the pipe manufactured is equal to the width of the film manufactured by the machine.

It is usual in machines of this nature to provide a mandrel upon which the pipe is formed from a plastic mixture of fibre and cement conveyed thereto, and deposited thereon by conveyor belts of felt, which have to be frequently replaced. Pressure is applied to the plastic material deposited on the mandrel, by means of a top felt and a pair of rollers to which hydraulic pressure is applied, the felt preventing adhesion of the material to the rollers.

An object of the present invention is to provide means whereby the latter top felt may be dispensed with, resulting in a considerable saving in the manufacture of the pipes.

According to the present invention the machine is provided with a mandrel as usual, upon which the pipe is formed from a plastic mixture of asbestos fibre and cement which is deposited on said mandrel by means of the usual material carrying felt.

Pressure to form the pipe is applied by two sets of rollers which are formed in sections or units each having means for applying pressure, such as a hydraulic ram.

The sections or units of rollers in one of the said sets are preferably staggered with relation to those of the other set, resulting in a substantially uniform distribution of pressure upon the pipe being formed.

The individual rollers constituting the aforesaid sets are preferably covered with rubber, with or without an outer covering of fabric, so that the arc of contact between the rollers and the pipe which is being formed is considerably greater than the arc of contact between the roller carrying the felt or conveyor band, and the pipe being formed. The result of this is that the maximum intensity of pressure over the arc of contact between the pressure roller and the pipe is less than the maximum intensity of pressure over the arc of contact made by the pipe and felt, and the felt carrying rollers.

The present invention enables a pipe to be made successfully irrespective of variation in diameter due to unequal distribution of the material from which it is being made, as the individual sections of pressure applying rollers are enabled to rotate at different speeds.

Consequently frictional drag upon the surface of the pipe as would be caused with a single long roller is avoided.

In order that the invention may be more readily understood reference will now be made to the accompanying drawing wherein—

The present invention is applicable to machines well known in the art of asbestos cement pipe manufacture as paper machines and as they do not form part of the present invention need not be described in detail.

It may be explained that in the manufacture of pipes upon a so-called paper machine, a mandrel is used upon which the pipe is formed by the application thereto of a pulp comprising cement and fibres, the pulp being conveyed to the mandrel by a suitable conveyor known as a felt, pressure being applied to the mandrel to consolidate the material thereon. It is to the pressure portion of the process that the present invention relates.

Figure 1:
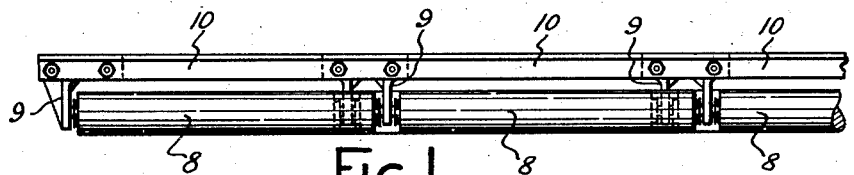
Figure 1 is an elevational view of portion of a set of pressure rollers in accordance with the present invention.
Figure 2:
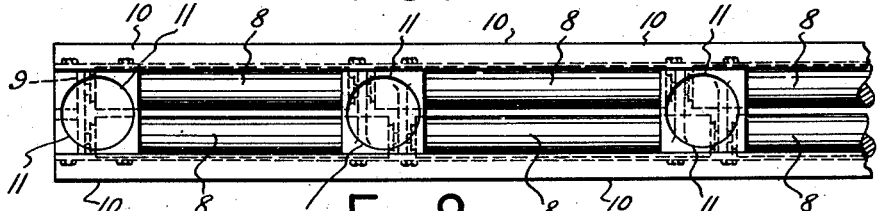
Figure 2 is a plan view thereof.
Figure 3:
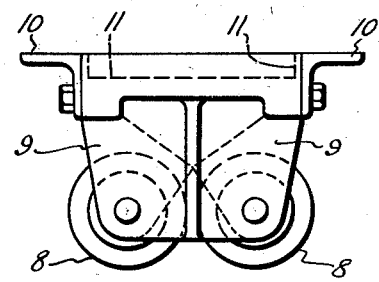
Figure 3 is an end elevation drawn to an enlarged scale, of the rollers seen in Figures 1 and 2.
Figure 4:
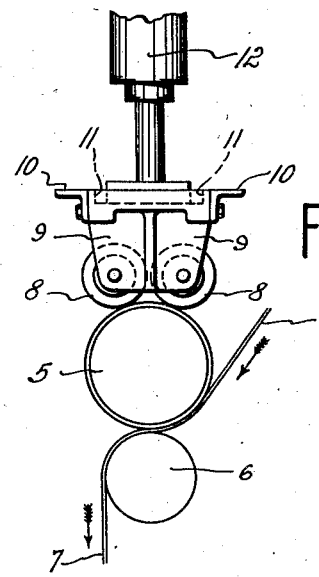
Figure 4 is a transverse diagrammatic view illustrating the pressure rollers which are mounted above the pipe and are operated by rams, portion of one of which is shown. This view also indicates the feed belt.

Referring to Figure 4 the mandrel 5 is illustrated above a conveyor cylinder 6 around which the pulp feed felt 7 is conducted, the pressure means which is the subject of Figures 1, 2 and 3 being shown diagrammatically above the mandrel in direct contact with the pipe being formed.

The pressure rollers (see Figures 1, 2 and 3) are disposed in two sets each of which comprises a plurality of rollers 8 mounted in bearing brackets 9 which are bolted to longitudinal members 10, seatings 11 for rams 12 being formed integral with the brackets 9, said rams being provided to exert the desired pressure between the respective rollers 8 and the pipe being formed on the mandrel 5.

The two sets of rollers 8 extend longitudinally for a distance equal or approximately equal to the length of the pipe being formed on the mandrel 5; and the ends of the rollers 8 in one set are caused to stagger those of the opposite set as shown in Figure 2. For this reason the end rollers 8 shown on the left in Figure 2 are of unequal length.

The construction however, provides for a continuous line of pressure between the rollers 8, as a whole, and the pipe being manufactured; and ensures that in the event of the pulp being unevenly distributed upon the mandrel 5, one or more of the roller units 8 may accommodate it or themselves to the change in diameter of the pipe at this particular point.

I claim:

1. In machines of the kind described for the manufacture of seamless pipes from cement and fibres of the type in which the length of the pipe manufactured is equal to the width of the film manufactured by the machine, means for effecting a uniform distribution of pressure upon the pipe comprising two sets of pressure rollers mounted in brackets, each set being formed from a plurality of separate rollers which extend longitudinally of the pipe, the rollers in one set being staggered with those in the other set.

2. In machines of the kind described for the manufacture of seamless pipes from cement and fibres, of the type in which the length of the pipe manufactured is equal to the width of the film manufactured by the machine, means for effecting a uniform distribution of pressure upon the pipe, comprising two members extending longitudinally of the pipe, a plurality of brackets secured to the members, a number of rollers disposed in pairs and supported at their ends by the brackets, said pairs of rollers being staggered to provide a continuous line of pressure between the conveyor cylinder and the pipe.

3. In machines for the manufacture of seamless pipes, from cement and fibres of the type in which the length of the pipe manufactured is equal to the width of the film manufactured by the machine, means for effecting a uniform distribution of pressure upon the pipe comprising two members extending longitudinally of the pipe, a plurality of brackets carried by the two members, a number of rollers supported in pairs from the brackets and extending longitudinally of the pipe, the pairs of rollers disposed at the ends of the members being of unequal length, the ends of the remaining pairs of rollers being staggered to provide a continuous line of pressure between the conveyor cylinder and the pipe.

ANDREW THYNE REID.